US012694727B2

(12) United States Patent
Linsmeier et al.

(10) Patent No.: US 12,694,727 B2
(45) Date of Patent: Jul. 28, 2026

(54) VEHICLE DATA COLLECTION SYSTEM AND METHODS

(71) Applicant: Oshkosh Corporation, Oshkosh, WI (US)

(72) Inventors: Catherine Linsmeier, Oshkosh, WI (US); Eric Linsmeier, Larsen, WI (US)

(73) Assignee: Oshkosh Corporation, Oshkosh, WI (US)

( * ) Notice: Subject to any disclaimer, the term of this patent is extended or adjusted under 35 U.S.C. 154(b) by 337 days.

(21) Appl. No.: 17/700,620

(22) Filed: Mar. 22, 2022

(65) Prior Publication Data

US 2022/0309844 A1 Sep. 29, 2022

Related U.S. Application Data

(60) Provisional application No. 63/164,861, filed on Mar. 23, 2021.

(51) Int. Cl.
| | |
|---|---|
| *G07C 5/08* | (2006.01) |
| *A62C 27/00* | (2006.01) |
| *G07C 5/00* | (2006.01) |
| *H04W 4/40* | (2018.01) |

(52) U.S. Cl.
CPC ............ *G07C 5/0808* (2013.01); *A62C 27/00* (2013.01); *G07C 5/008* (2013.01); *H04W 4/40* (2018.02)

(58) Field of Classification Search
CPC .... G07C 5/0808; G07C 5/008; G07C 5/0841; A62C 27/00; H04W 4/40
See application file for complete search history.

(56) References Cited

U.S. PATENT DOCUMENTS

| | | | |
|---|---|---|---|
| 5,638,273 | A | 6/1997 | Coiner et al. |
| 6,574,538 | B2 | 6/2003 | Sasaki |
| 8,630,764 | B2 | 1/2014 | Dabholkar |
| 8,836,784 | B2 | 9/2014 | Erhardt et al. |
| 9,168,882 | B1 * | 10/2015 | Mirza .................. B60R 16/037 |
| 10,686,976 | B2 | 6/2020 | Nalepka et al. |
| 2005/0229691 | A1 * | 10/2005 | Shaw .................. B60C 23/0408 |
| | | | 73/146 |
| 2006/0194566 | A1 * | 8/2006 | Oesterling ............. H04M 11/04 |
| | | | 455/427 |

(Continued)

FOREIGN PATENT DOCUMENTS

JP 2018-055191 A 4/2018

*Primary Examiner* — Navid Z. Mehdizadeh
*Assistant Examiner* — Caitlin R Mccleary
(74) *Attorney, Agent, or Firm* — Foley & Lardner LLP

(57) ABSTRACT

A vehicle includes wheels, a plurality of subsystems, an energy system configured to drive the plurality of wheels and to power the plurality of subsystems, a sensor in communication with at least one of the plurality of wheels, the plurality of sub systems system, and the energy system, and a control system including configured to, receive operating data from the sensor, determine an operating state of the vehicle based on the operating data received from the sensor, record the operating data at a first recording rate in response to determining a first operating state of the vehicle, and record the operating data at a second recording rate in response to determining a second operating state of the vehicle, wherein the first recording rate is different from the second recording rate and the first operating state is different from the second operating state.

20 Claims, 3 Drawing Sheets

(56)     References Cited

U.S. PATENT DOCUMENTS

| | | | |
|---|---|---|---|
| 2008/0215700 A1* | 9/2008 | Pillar ...................... B65F 3/045 |
| | | | 709/212 |
| 2009/0024274 A1 | 1/2009 | Nagai |
| 2012/0268601 A1 | 10/2012 | Yeh et al. |
| 2013/0245880 A1 | 9/2013 | Mcquade |
| 2014/0195071 A1 | 7/2014 | Hunt |
| 2014/0313057 A1* | 10/2014 | Kokal .................. G06V 20/593 |
| | | | 340/928 |
| 2015/0279125 A1 | 10/2015 | Chronowski et al. |
| 2016/0112216 A1* | 4/2016 | Sargent ................. G07C 5/008 |
| | | | 370/328 |
| 2016/0304051 A1* | 10/2016 | Archer .................... B60R 25/25 |
| 2017/0345232 A1 | 11/2017 | Hunt |
| 2018/0013862 A1 | 1/2018 | Hori et al. |
| 2019/0156681 A1* | 5/2019 | Whiting ............. H04B 7/18506 |
| 2019/0188924 A1* | 6/2019 | Guan .................... G07C 5/008 |
| 2022/0120449 A1* | 4/2022 | Bartos .................. G06F 16/907 |

* cited by examiner

VEHICLE DATA COLLECTION SYSTEM AND METHODS

CROSS-REFERENCE TO RELATED APPLICATION

This Application claims priority to U.S. Provisional Patent Application No. 63/164,861, filed Mar. 23, 2021, the content of which is hereby incorporated by reference in its entirety.

BACKGROUND

Vehicles, including response vehicles (e.g., fire trucks, fire engines, etc.), may track and record data related to the performance of the utility vehicles. Further, this data may be wirelessly transmitted (e.g., to a command center, other utility vehicles, etc.) such that the vehicle's performance may be shared with other computing systems.

SUMMARY

The described aspects of the invention are capable of other embodiments and of being carried out in various ways. Alternative exemplary embodiments relate to other features and combinations of features.

One embodiment relates to a vehicle. The vehicle includes a plurality of wheels, a plurality of subsystems, an energy system configured to drive the plurality of wheels and to power the plurality of subsystems, a sensor in communication with at least one of the plurality of wheels, the plurality of subsystems, and the energy system, and a control system including a non-transitory computer-readable storage medium having instructions stored thereon, the control system configured to receive operating data from the sensor, determine an operating state of the vehicle based on the operating data received from the sensor, record the operating data at a first recording rate in response to determining a first operating state of the vehicle, and record the operating data at a second recording rate in response to determining a second operating state of the vehicle, wherein the first recording rate is different from the second recording rate and the first operating state is different from the second operating state.

Another embodiment relates to a vehicle. The vehicle includes a drive system configured to cause movement of the vehicle, a pump system configured to pump fluid, an engine system configured to drive the drive system and to power the pump system, and a control system including an input device configured to receive a plurality of operator inputs, and a non-transitory computer-readable storage medium having instructions stored thereon, the control system configured to, control the engine system in response to receiving a first operator input, control the pump system in response to receiving a second operator input, determine an operating state of the vehicle based on the plurality of operator inputs, transmit a first set of operating data at a first transmission rate in response to determining a first operating state of the vehicle, and transmit a second set of operating data, including a second data set, at a second transmission rate in response to determining a second operating state of the vehicle, wherein the first transmission rate is different from the second transmission rate and the first operating state is different from the second operating state.

Another embodiment relates to a system including an engine, a fuel tank configured to store a fuel used by the engine, a pumping system including a water tank configured to store water, one or more sensors configured to detect at least one of engine data corresponding with an engine output, fuel level data corresponding with a fuel level in the fuel tank, or water level data corresponding with a water level in the water tank, and a control system including a processing circuit configured to monitor at least one of the engine data, the water level data, or the fuel level data, determine an operating state of the system, transmit a first data set in response to determining a first operating state, wherein the first data set omits at least one of the engine data, the water level data, or the fuel level data, and transmit a second data set in response to determining a second operating state, wherein the second data set includes the engine data, the water level data, and the fuel level data.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
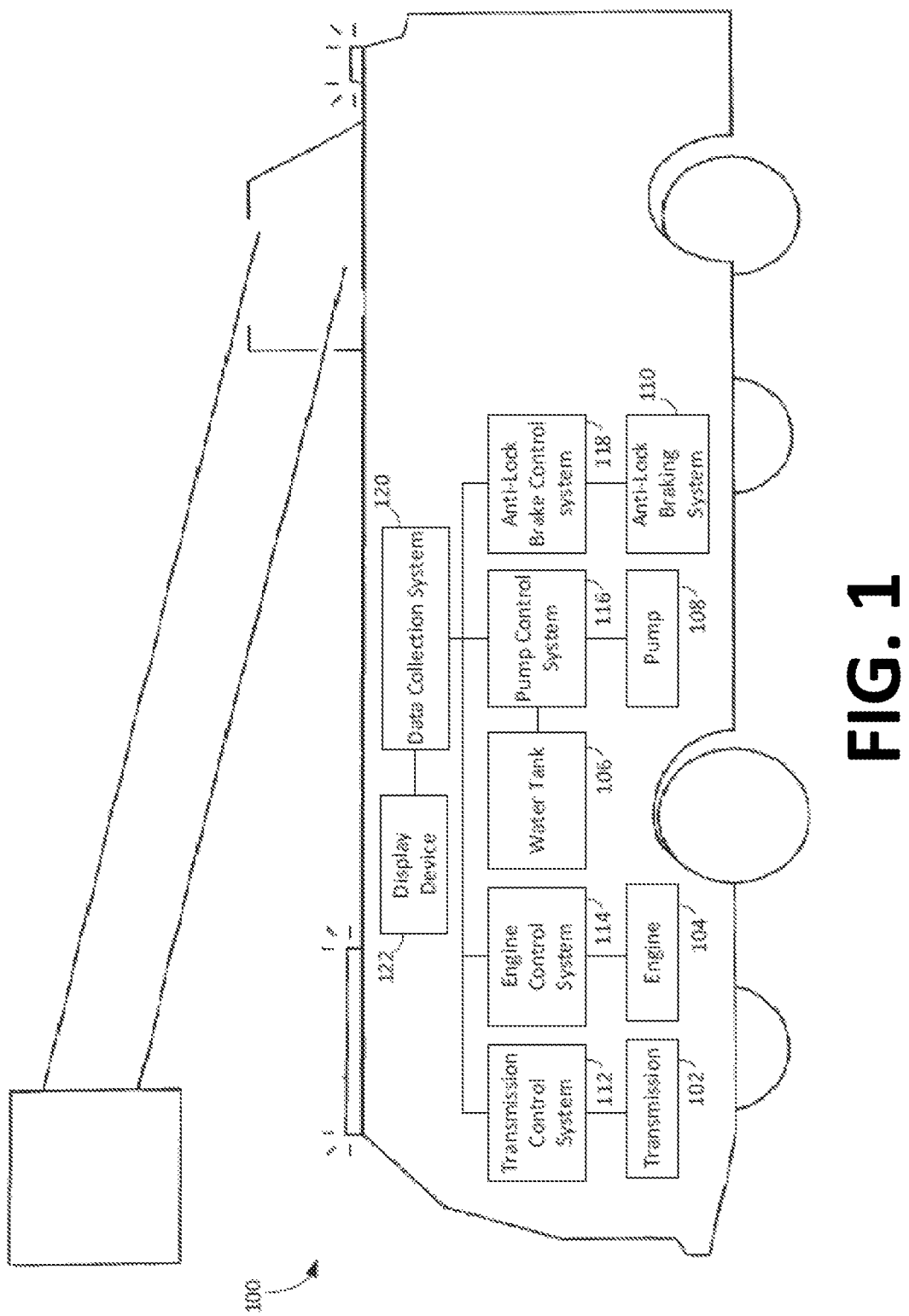
FIG. 1 is a perspective view of a response vehicle including various features described herein, according to an exemplary embodiment.

Before turning to the figures, which illustrate the exemplary embodiments in detail, it should be understood that the present application is not limited to the details or methodology set forth in the description or illustrated in the figures. It should be understood that the terminology is for the purposes of description only and should not be regarded as limiting.

Systems and methods are described herein for providing various features as part of a data collection system associated with a vehicle. More particularly, systems and methods are described for providing a response vehicle with a data collection system. The data collection system includes or interacts with various sensors dispersed throughout the response vehicle. Each of the sensors may capture data points regarding an operational aspect of a vehicle subsystem (e.g., a transmission, a water pump, a generator, a governor, a braking system, a lighting system, and the like). The data collection system is configured to receive the data points captured by the sensors, generate a scene data summary based on the received data points, and transmit data associated with the data points to external computer systems. The scene data summary may further be provided to a display device included in the vehicle, such that an operator of the vehicle is presented with graphical representations of various operational aspects of the vehicle and other scene data.

The data collection system includes a transceiver configured to interface with other computing devices (e.g., at a control center, fleet management system, other vehicles, a mobile device, etc.). The data collection system may further format any generated datasets (e.g., the scene summary) for transmittal by way of the transceiver to the other computing devices. For example, the scene data summary may be formatted as a webpage that is viewable via a web browser on the other computing device. Further, the scene data summary may be formatted in compliance with a standardized format (e.g., the National Firefighters Registry Sub-committee (NFRS), such that the data can be used to recreate scene for training events.

According to various embodiments, the data collection system is further configured to selectively record data points at predetermined intervals. For example, the data collection system may determine an operating state of the vehicle (e.g., emergency response, pumping event, etc.) and adjust the predetermined intervals accordingly. For example, the data collection system may cause the sample rate of the sensors to change depending on the operating state of the vehicle. For example, the data collection system may cause the sensors to sample at a first rate in response to an emergency response operating state being detected and a second rate in response to a non-emergency operating state being detected. According to various embodiments, the first rate corresponds with the sensors taking measurements at a more frequent rate (e.g., once every two minutes) than the second rate (e.g., once every thirty minutes). By increasing the sample rate during emergency event operating, a more thorough data set may be collected, which may be beneficial for at least remote monitoring of the vehicle and for accurately recreating the emergency event in future training exercises. By decreasing the same rate during non-emergency events, sensor life may be extended as well as reducing the strain on the memory of the data collection system.

According to various embodiments, the data collection system may selectively cause a specific subset of sensors to measure data in response to an operating state of the vehicle being determined. For example, the data collection system may cause certain sensors (e.g., a water level sensor in the pump system) to sample at a higher rate during a pumping event than other sensors (e.g., an engine output sensor). Further, the data collection system may cause certain sensors to stop measuring data (i.e., set a sample rate of zero) in response to determining a specific operating state.

According to various embodiments, the data collection system is further configured to selectively transmit data points at predetermined intervals. For example, the data collection system may determine an operating state of the vehicle (e.g., emergency response, pumping event, etc.) and adjust the predetermined intervals accordingly. For example, the data collection system may cause the transmission rate of the transceiver to change depending on the operating state of the vehicle. For example, the data collection system may cause the transceiver to send data at a first rate in response to an emergency response operating state being detected and a second rate in response to a non-emergency operating state being detected. According to various embodiments, the first rate corresponds with the transceiver sending data points at a more frequent rate (e.g., once every two minutes) than the second rate (e.g., once every thirty minutes). By increasing the transmission rate during emergency events, a more thorough data set may be transmitted, which may be beneficial for at least remote monitoring of the vehicle and for accurately recreating the emergency event in future training exercises. By decreasing the transmission rate during non-emergency events, the strain on the external communication system may be reduces (e.g., by reducing the required cellular data bandwidth). Further, the data collection system may selectively According to various embodiments, the data collection system may selectively transmit data points from a specific subset of sensors in response to an operating state of the vehicle being determined. For example, the data collection system may transmit data points from certain sensors (e.g., a water level sensor in the pump system) at a higher rate during a pumping event than other sensors (e.g., an engine output sensor).

Referring to FIG. 1, a vehicle, shown as a fire truck 100, includes a transmission systems, shown as a transmission control system 112 and a transmission 102; an engine system, shown as an engine control system 114 and an engine 104; a pump system, shown as a water tank 106, a pump 108, and a pump control system 116; and a brake system, shown as anti-lock brake control system 118 and anti-lock braking system 110. The fire truck 100 is further shown to include a data collection system 120 and a display device 122 communicably coupled to the data collection system 120. Other vehicle subsystems and corresponding controller systems may also be included in the fire truck 100. Such other system may include an interlock system, a transmission, a power take off (PTO), a foam system, a water tank, a lighting system, a life control device, etc.

Figure 2:
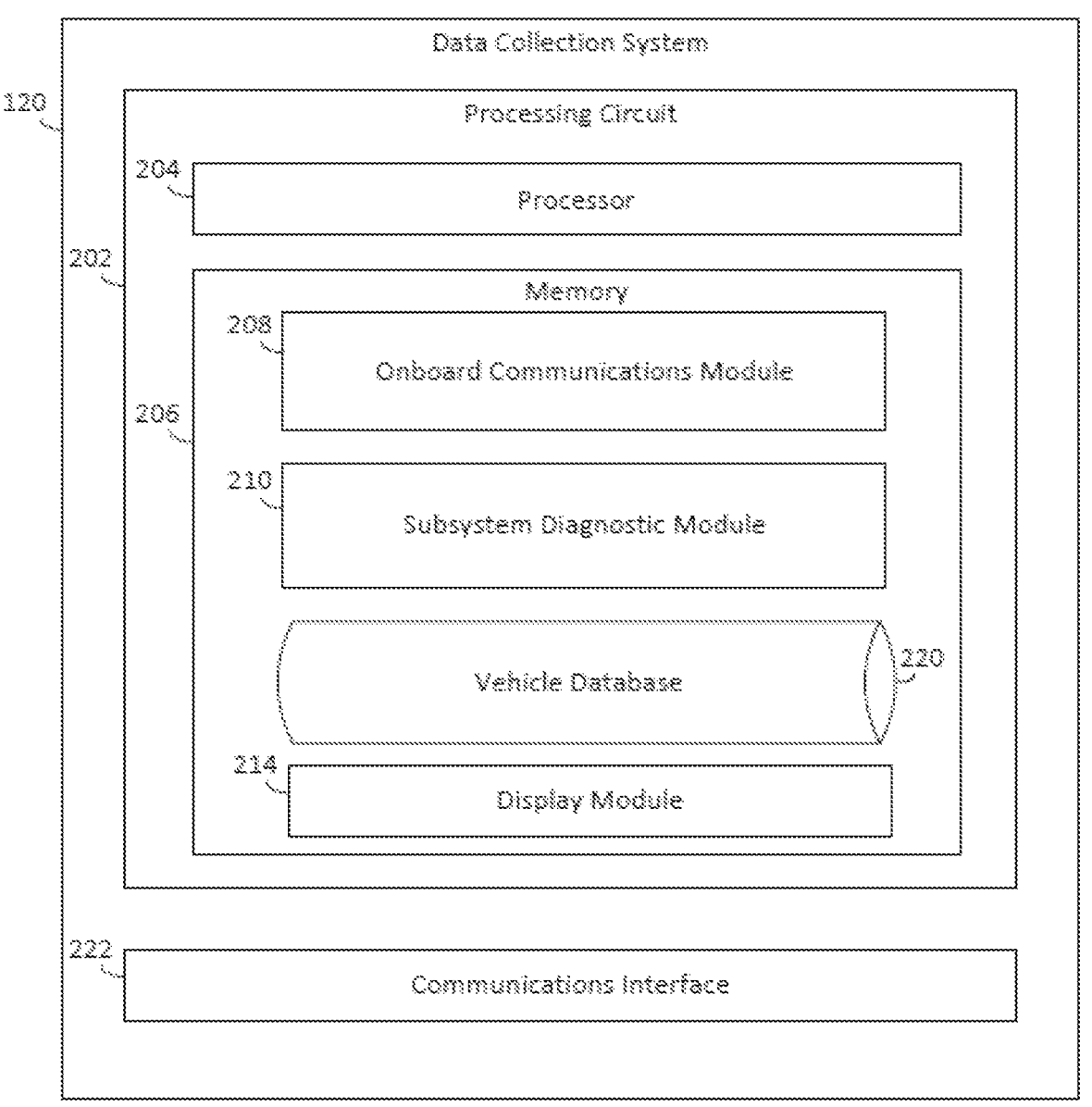
FIG. 2 is a block diagram of a data collection system for a response vehicle, according to an exemplary embodiment.
Figure 3:
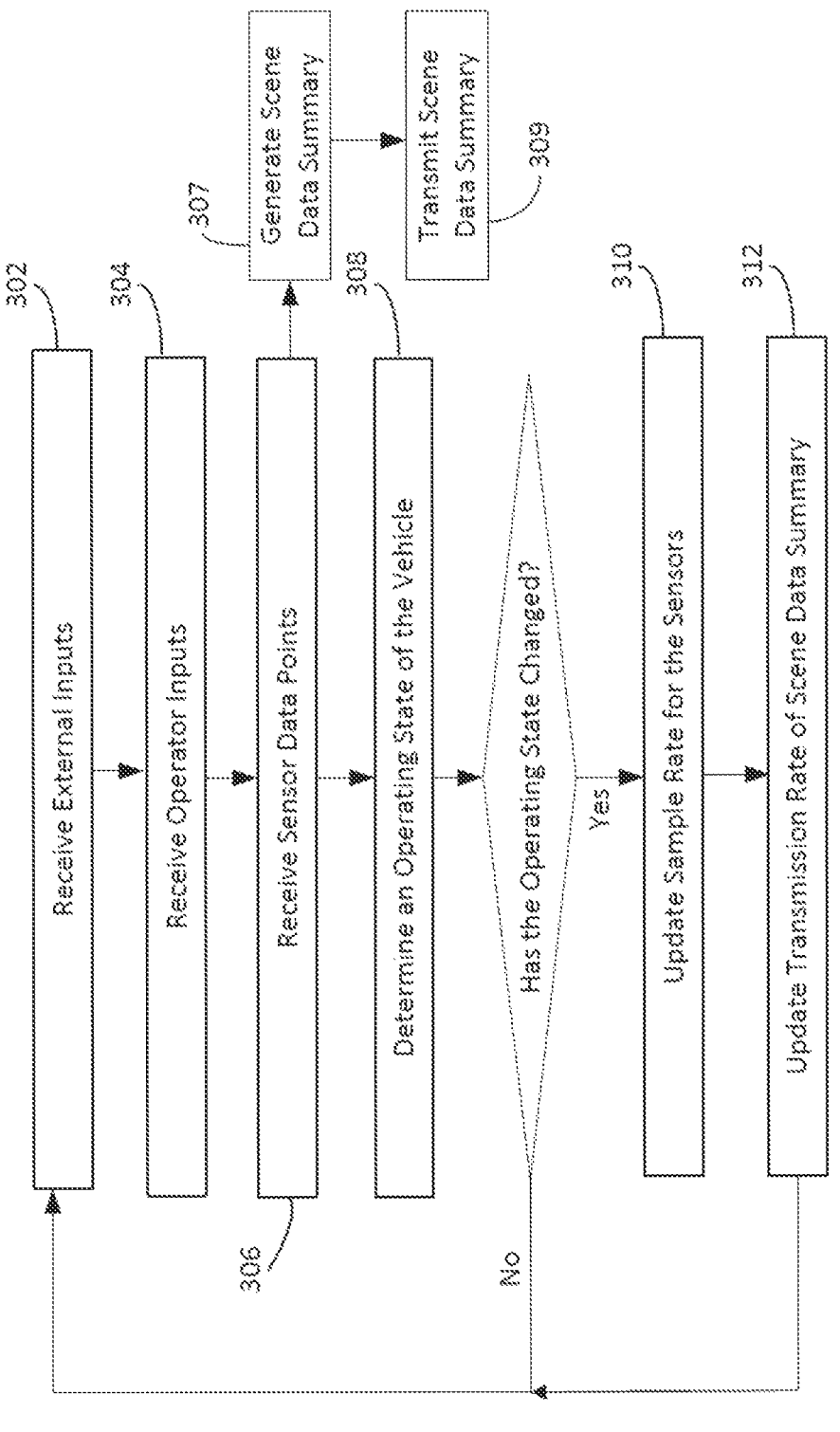
FIG. 3 is a detailed block diagram of a data collection process, according to an exemplary embodiment.

According to the exemplary embodiment shown in FIGS. 1-3, the fire truck 100 is a municipal fire fighting vehicle. According to alternative embodiments, the fire truck may include an Aircraft Rescue Fire Fighting (ARFF) vehicle, a forest fire apparatus, an aerial truck, a rescue truck, a tanker, or still another type of fire fighting vehicle. According to still other embodiments, the vehicle is another type of vehicle (e.g., a military vehicle, a commercial vehicle, etc.).

In the exemplary embodiment shown, each vehicle subsystem controller 112-118 is configured to transmit control signals to corresponding vehicle subsystems 102-110 to facilitate the operation of the fire truck 100. For example, the engine control system 114 may provide a control signal to the throttle of the engine 104 of the fire truck 100 to control the combustion rate of fuel from a fuel source, thereby controlling the speed of the fire truck 100. In various example embodiments, the control signals provided by the vehicle subsystem controllers 112-118 may be dependent on various inputs provided by an operator of the fire truck 100. For example, the fire truck 100 may include an operator input (not shown) configured to receive inputs from the operator or other personnel and provide various inputs to vehicle subsystem controllers 112-118. The operator input may include one or more buttons, knobs, touchscreens, switches, levers, joysticks, pedals, or handles. For example, the operator input may include a button enabling the operator to change the operating mode of the pump control system 116 so as to pump water form a water source using the pump 108. In another example, the operator input may also include an accelerator pedal enabling the operator to provide an input signal to the engine control system 114. In some embodiments, such inputs may be provided via the data collection system 120 via processes described below. It should be understood that, in some embodiments, other vehicle subsystem controllers 112-118 may not provide such an input to their corresponding vehicle subsystems. For example, a tire inflation subsystem controller may merely monitor an attribute or aspect (e.g., the air pressure of various tires of the fire truck 100) rather than provide an actuating input to the tires.

In the exemplary embodiment shown, each vehicle subsystem controller 112-118 includes at least one sensor. Each sensor is configured to capture a sensor data point that is indicative of the status of an operational aspect of the corresponding vehicle subsystem 102-110. For example, a sensor associated with the transmission control system 112 may measure any combination of a transmission temperature, a transmission fluid level, and/or transmission state (e.g., the current gear of the transmission 102). In another example, a sensor associated with an engine 104 may measure any combination of an engine speed, engine hours, oil temperature, oil pressure, oil level, coolant level, fuel level, and so on. In another example, a sensor associated with a water tank 106 may measure a water level of the water tank. As will be appreciated, the form of the sensors will vary depending on the particular vehicle subsystem 102-110 that the sensor is configured to measure and the particular operational aspect of the vehicle subsystem 102-110 that the sensor is configured to measure.

The data collection system 120 is configured to enable the operator and other users to interface with various vehicle subsystems 102-110 of the fire truck and monitor various other aspects of the fire truck 100. In this regard, the data collection system 120 is configured to receive the sensor data points from the sensors discussed above, generate scene data summaries based on the received sensor data points, and transmit the scene data summaries to the display device 122 and/or any external computing systems via the methods described below for presentation to the operator of the fire truck 100 or other user. In the exemplary embodiment shown, the data collection system 120 is further configured to establish connections with various external computing systems and transmit various communications (e.g., instructions, data, and the like) to those external computing systems. A more detailed embodiment of the data collection system is explained below in relation to FIG. 2.

Still referring to FIG. 1, the fire truck 100 further includes a display, shown as display device 122. The display device 122 may be, for example, a touchscreen display (e.g., a CANlink® CL-711 display manufactured by HED Inc., etc.) having a resistive touchscreen that receives a touch input from a user. The display device 122 may support any type of display feature, such as a flipbook-style animation, or any other type of transition feature. The display device 122 may generally provide a plurality of navigation buttons that allow a user to select various displays and other options via touch. The display device 122 may further, upon detection of a sensor data point captured by any of the vehicle subsystem controllers 112-118 generate a graphical representation of the sensor data points (e.g., a scene data summary). For example, if a data point is received from a tire pressure sensor associated with a tire pressure control system, a tire pressure screen may be displayed that provides current tire pressure information for the response vehicle. The display device 122 may have a wired or wireless connection with other response vehicle subsystems and/or with remote devices.

The display device 122 may be configured to display a graphical user interface, an image, an icon, a notification, and indication, and/or still other information. In the exemplary embodiment shown, the display includes a graphical user interface configured to provide general information about the fire truck 100 captured by the various sensors included in the various vehicle subsystem controllers 110-118. Through such an interface, the operator of the fire apparatus may be able to view various fluid levels of the fire truck 100 (e.g., fuel level, water tank level, transmission fluid level, foam level, etc.), tire pressures, the mileage of the fire truck 100, battery voltage levels, and the like.

Additionally, via the graphical user interface, the operator may further be able to view the status of various other aspects of the fire truck 100. For example, as will be described below, the operator may view displays containing information regarding the performance of various subsystems of the fire truck 100. According to various embodiments, the operator may view displays containing scene data (e.g., estimated response times of various vehicles, locations of various vehicles, the status of various pumps, etc.).

The display device 122 may include any number of supporting buttons and other tactile user inputs to support interaction between a user and the display. For example, a plurality of push buttons may be located next to or below the display to provide the user with further options. It should be understood that the configuration of the display device 122 may vary without departing from the scope of the present disclosure.

The display device 122 may include or support various technologies. For example, the display device 122 be a touchscreen display and may be separated into any number of portions (e.g., a split-screen type display, etc.). For example, a first portion of the screen may be reserved for one particular type of display (e.g., warnings and alerts, etc.), while another portion of the screen may be reserved for general vehicle information (e.g., speed, fuel level, etc.). The display device 122 may be configured to handle any type of transition, animation, or other display feature that allows for ease of access of information on the display device 122.

In one embodiment, the display device 122 is coupled to a USB input, allowing the display software to be updated. For example, such updates may include updating the maps stored on the display (e.g., to improve navigation features, etc.). Further, custom files may be downloaded to the display (e.g., custom logos, images, text, etc.) to personalize the display device 122 for use in the fire truck 100.

The display may include any number of video inputs (e.g., from one or more cameras located on the fire truck 100, etc.). For example, the display may be capable of receiving four video inputs and may display up to four video inputs simultaneously on the display. The display may be configured to detect when a camera feed is up, therefore determining when to display a video input on the display or not (e.g., not displaying a blank or blue screen, etc.).

According to various embodiments, the information displayed (e.g., response times, response location, pump status, etc.) on the display module 214 may displayed in a standardized format. For example, the processor 204 may be configured to transform the some or all of the data received to comply with a standardized format, such as prescribed by the National Firefighters Registry Subcommittee (NFRS). In this example embodiment, the processor 204 may manipulate the received data to generate a scene data summary that complies with the NFRS, transmit the report to an external computing system, and display some or all of the report on the display module 214. For example, the report may be used by the external computing system to facilitate recreating scenes in future training activities.

Referring now to FIG. 2, a more detailed view of the data collection system 120 of the fire truck 100 of FIG. 1 is shown according to an exemplary embodiment. The data collection system 120 includes a processing circuit 202 including a processor 204 and a memory 206. Processor 204 may be a general purpose or specific purpose processor, an application specific integrated circuit (ASIC), one or more field programmable gate arrays (FPGAs), a group of processing components, or other suitable processing components. Processor 204 may be configured to execute computer code or instructions stored in memory 206 or received from other computer readable media (e.g., CDROM, network storage, a remote server, etc.) to perform one or more of the processes described herein. Memory 206 may include one or more data storage devices (e.g., memory units, memory devices, computer-readable storage media, etc.) configured to store data, computer code, executable instructions, or other forms of computer-readable information. Memory 206 may include random access memory (RAM), read-only memory (ROM), hard drive storage, temporary storage, non-volatile memory, flash memory, optical memory, or any other suitable memory for storing software objects and/or computer instructions. Memory 206 may include database components, object code components, script components, or any other type of information structure for supporting the various activities and information structures described in the present disclosure. Memory 206 may be communicably connected to processor 204 via processing circuit 202 and may include computer code for executing (e.g., by processor 204, etc.) one or more of the processes described herein.

The memory 206 is described below as including various modules. While the exemplary embodiment shown in the figures shows each of the modules 208, 210, 214 as being separate from one another, it should be understood that, in various other embodiments, the memory may include more, less, or altogether different modules. For example, the structures and functions of one module may be performed by another module, or the activities of two modules may be combined such that they are performed by only a signal module.

As shown in FIG. 2, the memory 206 includes an onboard communications module 208. Onboard communications module 208 is configured to facilitate wireless communications with external computing systems and with other vehicles via communications interface 222 (e.g., a transceiver, etc.). Communications interface 222 may support any kind of wireless standard (e.g., 802.11 b/g/n, 802.11a, etc.) and may interface with any type of external computing system wireless communication capability (e.g., cellular, Wi-Fi, etc.). Communications interface 222 may further facilitate wireless communications with an external global positioning system (GPS). Onboard communications module 208 may be any type of capable module (e.g., a CL-T04 CANect® Wi-Fi Module manufactured by HED Inc., etc.) configured to support wireless communications with the external computing systems and other response vehicles. In one embodiment, the external computing systems communicate with the response vehicles via Wi-Fi. In other embodiments, the communications between the external computing systems and/or response vehicles may be supported via CDMA, GSM, or another cellular connection. In still other embodiments, another wireless protocol is utilized (e.g., Bluetooth, Zigbee, radio, etc.).

As shown in FIG. 2, the memory 206 includes a subsystem diagnostic module 210. Subsystem diagnostics module 210 is structured to enable the processor 204 of the data collection system 120 to interface with various vehicle subsystem controllers 112-118 of the fire truck 100. In the exemplary embodiment shown, the data collection system 120, via the subsystems diagnostic module 210, may generate a vehicle subsystem report based on various sensor data points received from the subsystem controllers 112-118. The report may be generated by comparing the sensor data points received from the vehicle subsystem controllers 112-118 to a series of baseline sensor values. For example, a baseline sensor value for the pump control system 116 may include a threshold water level that is necessary for the fire truck to respond to any fire incident. Thus, upon receipt of a sensor data point indicative of the water level in the water tank 106, the processor 204 may compare the received data point to the baseline value to determine the operational status of the water tank 106. The generated report may indicate whether the measured water level of the water tank 106 is above or below the baseline value. As will be understood, there may be multiple baseline values with respect to each sensor of the vehicle subsystem controllers 112-118. A similar process may be repeated for each subsystem controller 112-118 to generate report indicating the status of each operational aspect of the fire truck 100 measured by the vehicle subsystem controllers 112-118.

According to various embodiments, the subsystem diagnostic module 210 is structured to enable the processor 204 to modify the sample rate of the various sensors included in the various vehicle subsystem controllers 112-118. For example, the processor 204 may modify the sample rate of a particular sensor in response to detecting a particular operating state. In this sense, the processor 204 may cause each sensor to selectively record data points at predetermined intervals. For example, the processor 204 may determine an operating state of the vehicle (e.g., emergency response, pumping event, etc.) and adjust the predetermined intervals accordingly. For example, the processor 204 may cause the sample rate of the sensors to change depending on the operating state of the vehicle. For example, the processor 204 may cause the sensors to sample at a first rate in response to an emergency response operating state being detected and a second rate in response to a non-emergency operating state being detected. According to various embodiments, the first rate corresponds with the sensors taking measurements at a more frequent rate (e.g., once every two minutes) than the second rate (e.g., once every thirty minutes). By increasing the sample rate during emergency event operating, a more thorough data set may be collected, which may be beneficial for at least remote monitoring of the vehicle and for accurately recreating the emergency event in future training exercises. By decreasing the same rate during non-emergency events, sensor life may be extended as well as reducing the strain on the memory 206 of the data collection system 120.

The subsystem diagnostic module 210 may be structured to interface with various other modules to present the vehicle subsystems report to an operator and/or other user. For example, the diagnostics module 210 may interface with the display module 214 to present the operator with the vehicle subsystem report via the display device 122. The display module 214 may be configured to present the generated vehicle subsystems report on the display device 122. Alternatively or additionally, the subsystem diagnostic module 210 may interface with the onboard communications module 208 so as to format the generated vehicle subsystem report into a webpage or the like that is viewable on a display device included in an external computing system and transmit the report data to the external computing system via the secure connection discussed above.

As shown in FIG. 2, the memory 206 further includes a display module 214. The display module 214 is structured to cause the processor 204 to generate various displays for viewing by the display device 122. In the example embodiments shown, the displays presented via the display device 122 may vary depending on various inputs received from the operator or other user. For example, the display module 214 may include a menu navigation module (not shown). The menu navigation module may present the operator with a menu interface presenting various options to the operator. Each option may include a selectable widget configured to cause the display module 214 to generate and/or retrieve a particular display in response to the operator's selection of the widget (e.g., by the operator touching the screen of the display device 122 in a position that corresponds to a particular widget). For example, the menu interface may include a vehicle subsystem widget. In response to the operator selecting the subsystem widget, the display module 214 may cause the processor 204 to provide the vehicle subsystem report discussed above on the display device 122. While display module 214 is described with reference to the fire truck 100 in FIG. 2, it should be understood that display module 214 may provide the same or a similar type of interface, with the same, similar, or different types of features (e.g., touchscreen input capability, etc.) to the external computing systems as well.

In some embodiments, the display module 214 may generate and/or retrieve various displays for presentation via the display device 122 in response to receiving various other inputs. For example, if the subsystem diagnostic module 210 determines that a particular subsystem 102-110 is operating sub-optimally in at least one respect (e.g., the tire pressure is below a threshold, the water level in the water tank 106 is below a threshold, a lighting system is failing to emit light, etc.), the display module 214 may generate a subsystem alert that identifies the sub-optimal subsystem 102-110 and the fault of the subsystem 102-110 (e.g., the display device 122 may present a message indicating that the braking system is malfunctioning).

In some embodiments, the data collection system 120 further includes a call reporting module (not shown). The call reporting module is configured to receive information pertaining to the fire truck's 100 response to a service call. For example, upon receiving an emergency call, a manager or the like may transmit a dispatch call to the fire truck 100 via an external computing system. The dispatch call may identify a type of call (e.g., the type of scene that requires the fire truck 100), a response address, and a dispatch time. Upon receipt of a dispatch call, the reporting module may configure the processor 204 to generate a run sheet entry for the dispatch call. The run sheet entry may include a report having various entries describing the call such as, the time that the vehicle was dispatched, the time the fire truck 100 was on scene, the mileage of the truck driven, the number of personnel on the fire truck 100, whether the pump 108 was engaged, the response address, and the type of dispatch call. The call reporting module is structured to cause the processor 204 to gather the information associated with the entries in the run sheet. For example, certain information may be gathered from the dispatch call received from the external computing system. Other information, such as the timing of the end of the call, the mileage driven, and the engagement status of the pump 108 may be determined based on the outputs of various vehicle subsystem controllers 112-118. For example, the call reporting module may interface with an odometer of the fire truck 100 to determine the miles driven. Additionally, the call reporting module may interface with the pump control system 116 to determine if the pump is engaged during the call. Other information may be manually input by the operator via the display device 122. Various completed run sheets may then be stored in the vehicle database 220, thus enabling the fire truck 100's utilization to be accurately monitored.

As shown in FIG. 2, memory 206 also includes a vehicle database 220 configured to store various forms of information pertaining to the fire truck 100. The vehicle database may include, for example, telemetric data captured by various vehicle subsystem controllers 112-118. For example, the subsystem diagnostic module 210 may include a data logger or the like that stores any sensor data points received from the subsystem controllers 112-118. The vehicle database 220 may include a plurality of telemetry datasets, with each dataset corresponding to a different sensor device of each vehicle subsystem controller 112-118. Each dataset may include a plurality of entries, with each entry including a sensor data point value and a time stamp. Alternatively or additionally, the vehicle database 220 may store the vehicle subsystem reports generated via the subsystem diagnostic module 210.

The stored data may be removed from the vehicle database 220 once the data is uploaded to a remote cloud storage. For example, long-term storage of the telemetry data and other data may be done on a centralized server, and communications interface 222 may wirelessly connect with a remote server to transmit and store the data. The data includes a timestamp and vehicle identifier information to identify the data in remote server.

In one embodiment, the data is automatically updated periodically. The data may also be updated upon user request. A controller area network (CAN) controller, such as subsystems diagnostics module 210 or another module may be configured to monitor the data and to determine when a potential status of the fire truck has changed based on the telemetry data changes.

According to various embodiments, the processor 204 may cause the communications interface 222 to selectively transmit data points at predetermined intervals. For example, the processor 204 may determine an operating state of the vehicle (e.g., emergency response, pumping event, etc.) and adjust the predetermined intervals accordingly. For example, the processor 204 may cause the transmission rate of the communications interface 222 to change depending on the operating state of the vehicle. For example, the processor 204 may cause the transceiver to send data at a first transmission rate in response to an emergency response operating state being detected and a second transmission rate in response to a non-emergency operating state being detected. According to various embodiments, the first transmission rate corresponds with the transceiver sending data points at a more frequent rate (e.g., once every two minutes) than the second transmission rate (e.g., once every thirty minutes). By increasing the transmission rate during emergency event operating, a more thorough data set may be transmitted by the communications interface, which may be beneficial for at least remote monitoring of the vehicle and for accurately recreating the emergency event in future training exercises. By decreasing the transmission rate during non-emergency events, sensor life may be extended as well as reducing the strain on the memory of the data collection system.

According to various embodiments, the processor may selectively transmit a subset of the data (e.g., data points from a specific subset of sensors) in response to an operating state of the vehicle being determined. For example, the data collection system may transmit data points from certain sensors (e.g., a water level sensor in the pump system) at a higher rate during a pumping event than other sensors (e.g., an engine output sensor). By reducing the total number of data points being transmitted, the strain on the communications interface 222 may be reduced.

Vehicle database 220 may be any type of database (e.g., a SQLite database, etc.), and modules 208-218 may query the database using any type of language or method via backend framework. The backend framework of data collection system 120 may support the activities of periodically updating and querying vehicle database 220, as well as providing web layer authentication (e.g., to authenticate devices that attempt to access data from vehicle database 220, etc.). The backend framework may further support the various security-related functionality of onboard communications module 208.

Data collection system 120 may include, for example, a data transport protocol layer configured to facilitate the query of data from vehicle database 220 for use by the various modules of memory 206. In one embodiment, at least one of web sockets and AJAX polling is used to invoke queries via backend framework and provide the data to the frontend applications (e.g., the application layer, the modules, etc.), as they allow changes to database 220 to be detected and pushed to the application layer. The use of web sockets and/or AJAX may be based on compatibility constraints and performance constraints with the external computing system accessing the data collection system 120. The application layer, or the frontend application, of data collection system 120 may be built using, for example, HTML5, CSS, and various Javascript libraries.

Referring now to FIG. 3, a data collection process 300 is shown according to an example embodiment. According to an example embodiment, the data collection process 300 may be executed by the data collection system 200. The data collection process 300 may be utilized to record and transmit data associated with a vehicle (e.g., the fire truck 100). It should be appreciated that the data collection process 300 is meant to be illustrative and not limiting in nature. For example, the various processes included in the data collection process 300 may be performed in any order. Further, certain processes may be omitted. Furthermore, the various processes may be performed in any order, according to various embodiments.

At process 302, external inputs are received. For example, external inputs from an external computing system (e.g., a command center, another vehicle, etc.) may be received by the data collection system 120. The external inputs may include command data from a command center (e.g., a fleet management system). For example, a command center may send an external input to the data collection system 120 to deploy the vehicle (e.g., in response to an emergency). The external inputs may include various parameters that define the characteristics of the deployment. For example, the external input may include a parameter indicating that location of an emergency (e.g., GPS coordinates, a street address, etc.), the type of emergency (e.g., a fire, a medical emergency, etc.), other vehicles being deployed to the emergency, and any other details that may be relevant to the deployment.

At process 304, operator inputs are received. For example, operator inputs may be received by the data collection system 120 from an operator of the vehicle. According to various embodiments, operator inputs (e.g., pressing the accelerator, activating the pump system, etc.) are used to control the performance of the vehicle. According to various embodiments, operator inputs may further include selections made on display device 122. For example, a user may indicate a current operating state of the vehicle using the display device 122. For example, an operator may select "emergency response" or "pumping event" on the display device 122.

At process 306, sensor data points are received. For example, data points may be received from one or more of the sensors included in the various subsystem controllers 112-118 included on the vehicle. The sensor data points may indicate a current operating status of various components including each subsystem, as described above. The sensor data points may also include location data for the vehicle, such as a GPS location of the vehicle. According to various embodiments, the sample rate of each sensor may be individually adjusted. For example, the sample rate of each sensor may be adjusted based on the operating state of the vehicle. After completion of process 306, an operating state of the vehicle may be determined at process 308 and/or a scene data summary may be generated at process 307, as is described further below.

At process 307, a scene data summary is generated. The scene data summary may include data corresponding with the external inputs, the operator inputs, and the sensor data points. For example, the scene data summary may include the location of an emergency, the response time (e.g., an estimated driving time to the location of the emergency), a pump status (e.g., an indication of whether the water reservoir includes a sufficient amount of water, etc.), a current fuel status (e.g., an indication of the amount of fuel left and the range of the vehicle on that tank of fuel), etc. According to carious embodiment, process 307 manipulating the scene data summary into a standardized format. For example, the generated scene data summary may comply with the National Firefighters Registry Subcommittee (NFRS) guidelines, such that the scene data summary may be used to recreate the events surrounding an emergency for training events.

According to various embodiments, the scene data summary may selectively omit certain data (e.g., operator inputs, sensor data points, etc.). For example, in response to determining the operating state is a pumping event (e.g., during a fire emergency), where the vehicle is dispensing water, the scene data summary may not include data points from various subsystems (e.g., the transmission control system 112, the engine control system 114, the anti-lock brake control system 118, etc.). In another example, when a non-emergency event is detected, the scene data summary may omit data received from the pump control system 116.

According to various embodiments, the scene data summary may include the raw data from and some or all of the inputs and data points received at process 302, process 304, and process 306. The raw inputs and data points may then be transmitted to an external computing system at process 309 such that the raw data may be analyzed.

At process 309, the scene data summary is transmitted. For example, the scene data summary may be transmitted to the display device 122 such that the operator or another person may view the scene data summary. Further, the scene data summary may be transmitted to an external computing system, such as a command center and other vehicles. According to various embodiments, an updated scene data summary is transmitted according to predetermined intervals (i.e., the transmission rate). For example, in response to determining a pumping event, the data collection system 120 may be configured to transmit scene data summary once every two minutes so that an external computing system (e.g., a fleet management service) can more closely monitor the performance of the truck. When a non-emergency operating state is detected (e.g., the vehicle is not pumping water), the data collection system 120 may be configured to transmit the scene data summary once every thirty minutes to reduce cellular data consumption, while still providing periodic operational information to the fleet management service.

At process 308, an operating state of the vehicle is determined. For example, the data collection system 120 may analyze the data received during process 302, process 304, and process 306 to determine an operating state of the vehicle. For example, the data collection system 120 may determine a pumping event operating state in response to detecting lowering fluid level in the water tank 106. In another example, the data collection system 120 may determine an emergency transit event operating state in response to determining the speed of the vehicle (e.g., as measured by a sensor in the engine control system 114, as measured by the GPS, etc.) exceeding a predetermined value (e.g., the legal speed limit). In another example, the operating state may be determined based on the external inputs. For example, if a fleet management system selects the vehicle as a response vehicle for an active emergency (e.g., as indicated by parameters included in external input), the data collection system 120 may determine the operating state to be an emergency.

According to various embodiments, process 308 may further include presenting a confirmation notification on the display device 122. For example, the data collection system 120 may cause a confirmation notification to be displayed on the display device 122, such that an operator of the vehicle or another person may confirm the operating state of the vehicle. For example, the display device 122 may display an indication of the determined operating state and prompt a user to confirm the determined operating status (e.g., by pressing a button).

Once the operating state of the vehicle is determined, the data collection system 120 compares the operating state to the previous determined operating state. If the operating state has not changed, the process 300 reverts back to process 302 and additional data is collected. If the operating state has changed, the process 300 continues to process 310.

At process 310, the sample rate of the sensors is updated. For example, the data collection system 120 may modify the sample rate of each individual sensor in response to detecting a particular operating state of the vehicle. In this sense, the processor 204 may cause each sensor to selectively measure data points at predetermined intervals of time. For example, the sample rate may be updated based on the updated operating state of the vehicle (e.g., emergency response, pumping event, etc.), as determined during process 308. For example, the data collection system 120 may cause the sensors included in the pump control system 116 to sample at a first rate in response to an emergency response operating state being detected and a second rate in response to a non-emergency operating state being detected. According to various embodiments, the first rate corresponds with the sensors taking measurements at a more frequent rate (e.g., once every two minutes) than the second rate (e.g., once every thirty minutes). By increasing the sample rate during emergency event operating, a more thorough data set may be collected from the pump control system 116, which may be beneficial for at least remote monitoring of the vehicle and for accurately recreating the emergency event in future training exercises. By decreasing the same rate during non-emergency events, sensor life may be extended as well as reducing the strain on the memory 206 of the data collection system 120.

At process 312, the transmission rate of the scene data summary is updated. For example, the data collection system 120 may determine an operating state of the vehicle (e.g., emergency response, pumping event, etc.) as a part of process 308 and adjust the predetermined intervals between scene data summary transmissions (i.e., the transmission rate) accordingly. For example, the data collection system may cause the transmission rate of the transceiver to change depending on the operating state of the vehicle. For example, the data collection system may cause the transceiver to send scene data summaries at a first transmission rate in response to an emergency response operating state being detected and a second rate in response to a non-emergency operating state being detected. According to various embodiments, the first transmission rate corresponds with the transceiver sending data points at a more frequent rate (e.g., once every two minutes) than the second transmission rate (e.g., once every thirty minutes). By increasing the transmission rate during emergency event operating, a more thorough data set may be transmitted, which may be beneficial for at least remote monitoring of the vehicle and for accurately recreating the emergency event in future training exercises. By decreasing the transmission rate during non-emergency events, the strain on an external communication system (e.g., the communications interface 222) may be reduced during a non-emergency event, thereby conserving data (e.g., cellular data). Further, the data collection system 120 may selectively omit certain data when transmitting the scene data summary based on the operating state of the vehicle. For example, the data collection system 120 may omit engine output data from the engine control system 114 in response to determining a pumping event as the operating state (e.g., at process 308). After process 312 is complete, the process 300 reverts back to process 302 and additional data is collected.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

Although this description may discuss a specific order of method steps, the order of the steps may differ from what is outlined. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the load map interface systems and methods as shown in the various exemplary embodiments is illustrative only. Additionally, any element disclosed in one embodiment may be incorporated or utilized with any other embodiment disclosed herein. For example, the warning zones of the exemplary embodiment may be eliminated or additional zones may be added. Although only one example of an element from one embodiment that can be incorporated or utilized in another embodiment has been described above, it should be appreciated that other elements of the various embodiments may be incorporated or utilized with any of the other embodiments disclosed herein.

Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating states, and arrangement of the preferred and other exemplary embodiments without departing from scope of the present disclosure or from the spirit of the appended claims.

The invention claimed is:

1. A fire truck comprising:
an engine system including an engine;
an engine system sensor in communication with the engine system;

a pump system including a pump;
a pump system sensor in communication with the pump system; and
a data collection system including a transceiver and a non-transitory computer-readable storage medium having instructions stored thereon, the data collection system configured to:
    acquire, from the engine system sensor, engine system sensor data;
    acquire, from the pump system sensor, pump system sensor data;
    determine, based on at least one of the engine system sensor data or the pump system sensor data, an operating state of the fire truck;
    in response to determining that the operating state of the fire truck corresponds with an emergency response operating state, maintain a sample rate of the engine system sensor and cause a sample rate of the pump system sensor to increase; and
    while the operating state of the fire truck corresponds with the emergency response operating state, transmit, via the transceiver, a scene data summary, the scene data summary including the pump system sensor data and excluding the engine system sensor data.

2. The fire truck of claim 1, wherein the data collection system is configured to, in response to determining that the operating state of the fire truck corresponds with the emergency response operating state, set the sample rate of the engine system sensor data to zero.

3. The fire truck of claim 1, wherein the data collection system is configured to:
prior to determining that the operating state of the fire truck corresponds with the emergency response operating state, transmit the pump system sensor data and the engine system sensor data once every thirty minutes; and
while the operating state of the fire truck corresponds with the emergency response operating state, transmit the scene data summary once every two minutes.

4. The fire truck of claim 1, wherein:
in the operating state that corresponds to the emergency response operating state, the pump outputs a fluid; and
in the operating state that corresponds to a non-emergency response operating state, the pump does not output the fluid.

5. The fire truck of claim 1, wherein:
the pump system includes a water tank; and
determining that the operating state of the fire truck corresponds with the emergency response operating state includes detecting, based on the pump system sensor data, a lowering fluid level in the water tank.

6. The fire truck of claim 1, wherein determining that the operating state of the fire truck corresponds with the emergency response operating state includes detecting, based on the pump system sensor data, activation of the pump.

7. The fire truck of claim 1, wherein the scene data summary includes an indication of whether a water reservoir of the pump system includes a sufficient amount of water.

8. The fire truck of claim 1, wherein the scene data summary includes at least one of a location of an emergency, a response time to the location of the emergency, or a current fuel status.

9. The fire truck of claim 1, further comprising a display, wherein transmitting the scene data summary comprises transmitting a graphical representation of the pump system sensor data to the display.

10. The fire truck of claim 1, wherein the scene data summary is formatted as a display page that recreates a scene of the emergency response operating state.

11. A method comprising:

acquiring, by a data collection system of a fire truck, engine system sensor data from an engine system sensor of the fire truck, the engine system sensor is in communication with an engine system of the fire truck, the engine system includes an engine;

acquiring, by the data collection system, pump system sensor data from a pump system sensor of the fire truck, the pump system sensor is in communication with a pump system of the fire truck, the pump system includes a pump;

determining, by the data collection system based on at least one of the engine system sensor data or the pump system sensor data, an operating state of the fire truck;

in response to determining that the operating state of the fire truck corresponds with an emergency response operating state, maintaining, by the data collection system, a sample rate of the engine system sensor and cause a sample rate of the pump system sensor to increase; and while the operating state of the fire truck corresponds with the emergency response operating state, transmitting, via a transceiver of the data collection system, a scene data summary, the scene data summary including the pump system sensor data and excluding the engine system sensor data.

12. The method of claim 11, wherein the data collection system is configured to, in response to determining that the operating state of the fire truck corresponds with the emergency response operating state, set the sample rate of the engine system sensor data to zero.

13. The method of claim 11, wherein the data collection system is configured to:

prior to determining that the operating state of the fire truck corresponds with the emergency response operating state, transmit the pump system sensor data and the engine system sensor data once every thirty minutes; and while the operating state of the fire truck corresponds with the emergency response operating state, transmit the scene data summary once every two minutes.

14. The method of claim 11, wherein:

in the operating state that corresponds to the emergency response operating state, the pump outputs a fluid; and in the operating state that corresponds to a non-emergency response operating state, the pump does not output the fluid.

15. The method of claim 11, wherein:

the pump system includes a water tank; and determining that the operating state of the fire truck corresponds with the emergency response operating state includes detecting, based on the pump system sensor data, a lowering fluid level in the water tank.

16. The method of claim 11, wherein determining that the operating state of the fire truck corresponds with the emergency response operating state includes detecting, based on the pump system sensor data, activation of the pump.

17. The method of claim 11, wherein the scene data summary includes an indication of whether a water reservoir of the pump system includes a sufficient amount of water.

18. The method of claim 11, wherein the scene data summary includes at least one of a location of an emergency, a response time to the location of the emergency, or a current fuel status.

19. The method of claim 11, at least one of:

further comprising a display, wherein transmitting the scene data summary comprises transmitting a graphical representation of the pump system sensor data to the display; or wherein the scene data summary is formatted as a display page that recreates a scene of the emergency response operating state.

20. A fire truck system comprising: an engine system sensor configured to acquire first sensor data regarding an engine system of a fire truck; a pump system sensor configured to acquire second sensor data regarding a pump system of the fire truck; a transceiver; and a non-transitory computer-readable storage medium having instructions stored thereon, that cause one or more processors to: acquire the first sensor data; acquire the second sensor data; determine, based on at least one of the first sensor data or the second sensor data, an operating state of the fire truck; in response to determining that the operating state of the fire truck corresponds with an emergency response operating state, maintain a sample rate of the engine system sensor and cause a sample rate of the pump system sensor to increase; and while the operating state of the fire truck corresponds with the emergency response operating state, transmit, via the transceiver, a scene data summary, the scene data summary including the pump system sensor data and excluding the engine system sensor data.

* * * * *